United States Patent

[11] 3,627,084

| [72] | Inventor | Vasile Benedek |
| | | Bucharest, Romania |
| [21] | Appl. No. | 866,217 |
| [22] | Filed | Oct. 14, 1969 |
| [45] | Patented | Dec. 14, 1971 |
| [73] | Assignee | Institutul de Proiectari si Cercetari Pentru Utilaj Petrolier |

[54] DUAL-CONTROL HAND BRAKE
7 Claims, 3 Drawing Figs.

[52] U.S. Cl. .................................... 188/105, 188/77
[51] Int. Cl. .................................... F16d 65/18
[50] Field of Search ............................ 188/105, 106 F, 77

[56] References Cited
UNITED STATES PATENTS

| 1,646,718 | 10/1927 | Wilkinson et al. | 188/105 X |
| 2,658,589 | 11/1953 | Ashton | 188/105 X |
| 2,847,094 | 8/1958 | Abraham | 188/105 X |

*Primary Examiner*—Duane A. Reger
*Attorney*—Karl F. Ross

ABSTRACT: A brake band for a drum brake is hydraulically or pneumatically tensionable by a servo piston under the control of a throttle valve mounted on a swingable arm which is mechanically linked with the brake band and whose pivotal axle supports an independently swingable operating lever. An abutment on that lever coacts with a spring loaded control pin for the throttle valve and also confronts a stop on that valve for rotative entrainment of the swingable arm to tension the brake band mechanically upon failure in the hydraulic or pneumatic circuit. The mechanical linkage between the brake band and the throttle valve normally maintains a certain gap between the lever abutment and the confronting stop.

Vasile Benedek
Inventor.

By Karl F. Ross
Attorney

DUAL-CONTROL HAND BRAKE

My present invention relates to a hydraulic or pneumatic brake adapted to be manually controlled for slowing or stopping winches, pulleys or other rotatable loads.

Fluid-actuated (i.e. hydraulic or pneumatic) brakes of this type are easier to operate than manual ones but do not give the operator the same "feel" of the braking effect as does a manually stressed mechanical linkage. Moreover, hydraulic and pneumatic circuits are liable to develop leaks or obstructions which reduce their effectiveness or make them completely inoperative.

It is, therefore, the general object of my invention to provide a brake system combining the advantages of hydraulic or pneumatic operation with the safety of a mechanical power train.

A more specific object is to provide a system wherein, upon failure of the fluid circuit, a mechanical linkage automatically takes over to transmit the force of a manual operating member to a brake band or other brake-actuating means.

These objects are realized, in accordance with my present invention, by the provision of fluid response servo means coupled with the brake-actuating means, the servo means being connected to a source of operating fluid by way of a hydraulic or pneumatic circuit including a throttle valve provided with a control element which, when acted upon by a manually displaceable member (preferably a lever), applies a variable fluid pressure to the servo means with resulting operation of the brake actuator; a lost motion connection exists between the manual operating member and a yieldable stop which is entrainable by that member upon a predetermined displacement thereof, this stop being connected by a mechanical linkage with the brake-actuating means for operating the latter in response to such entrainment upon failure of the fluid circuit.

According to a more specific feature of my invention, the throttle valve has a cylinder which is integral with the aforementioned stop so that, through feedback from the brake-actuating means via the mechanical linkage, this cylinder recedes from the advancing operating member as long as the fluid circuit functions normally. Thus, with the operating member bearing upon the valve body in the cylinder through the control element projecting therefrom, a certain clearance is always maintained between an abutment on the operating member and a confronting land on the cylinder whereby the stroke of the operating member considerably exceeds the relative motion of the valve body and its seat inside the cylinder. This increased stroke length, which affords a more sensitive adjustment of the braking force, can be further enhanced by the interposition of a loading spring or an equivalent resilient link between the control element and the valve body, only a part of the operating force being then transmitted to the valve body to displace same against the restoring force of its own biasing spring.

Pursuant to a further feature of this invention, the cylinder of the throttle valve and the lever representing the operating member are pivotable about a common fulcrum whereby, aside from the gain of a mechanical advantage, proper alignment between the control element of the throttle valve and a coacting abutment on the operating lever is ensured in all working positions.

The above and other features of my invention will be described in greater detail hereinafter with reference to the accompanying drawing in which.

Figure 1:
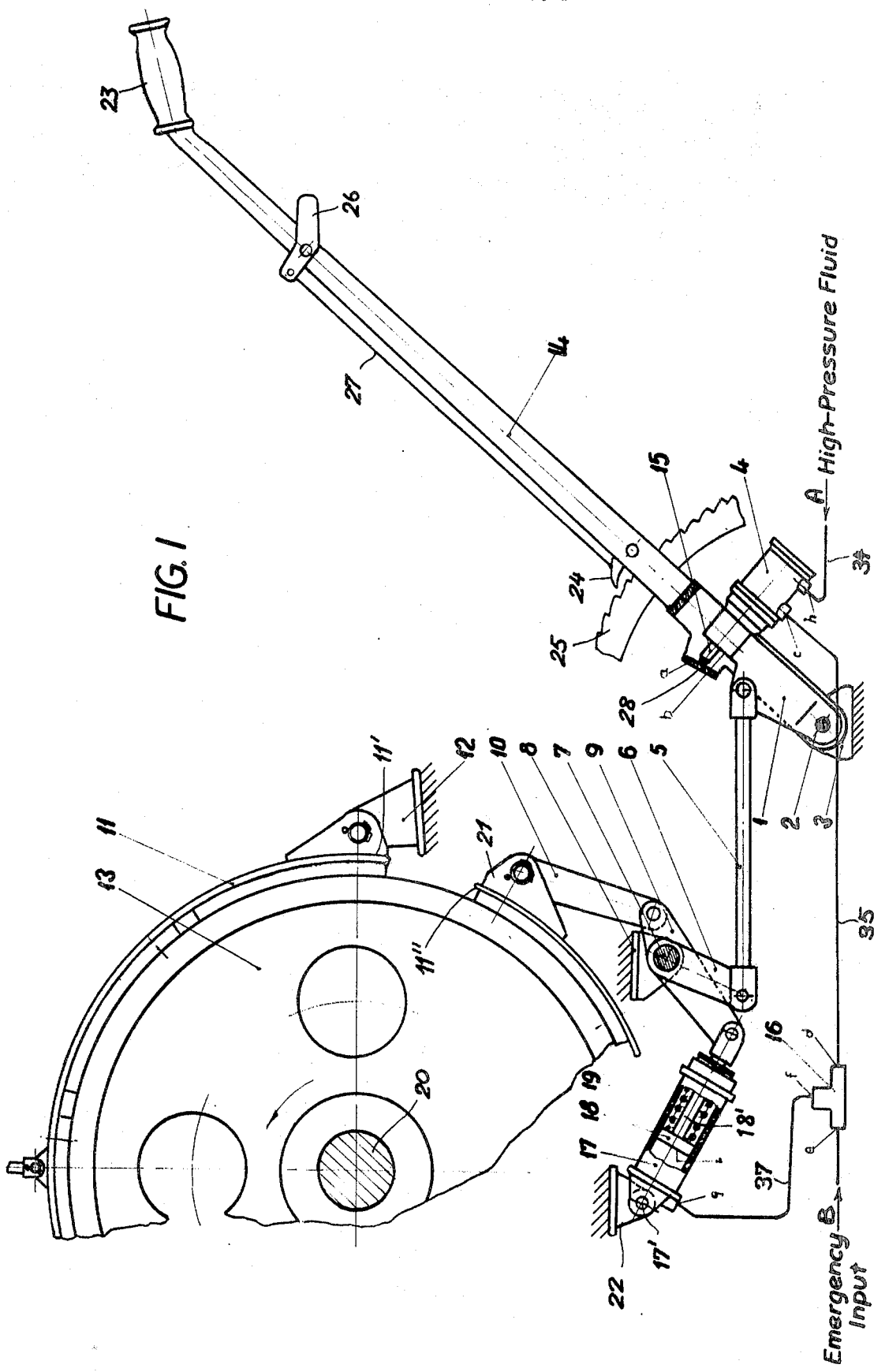
FIG. 1 is a somewhat diagrammatical elevational view of a control system having a drum brake illustrated only in part.

In FIG. 1, I have shown a brake drum 13 on a shaft 20 of a cable-winding capstan or other load. The drum 13 is enveloped by a brake band 11 having a first end 11' fixedly anchored at 12 and having a second end 11" secured to a mobile shoe 21. A pivot pin 7, journaled in a fixed bearing 8, is rigid with a lever arm 9 and with a second such arm 6 whereby the elements 6, 7, 9 form a swingable integral unit. One end of arm 9 is articulated through a link 10 with the brake shoe 21, its other end being articulated to a rod 18' of a piston 18 lodged in a cylinder 17 and biased inwardly by a compression spring 19. The assembly 17-19 constitutes a hydraulic or pneumatic servomotor and is bodily swingable about a pivot 17' on a fixed mounting 22.

Figure 2:
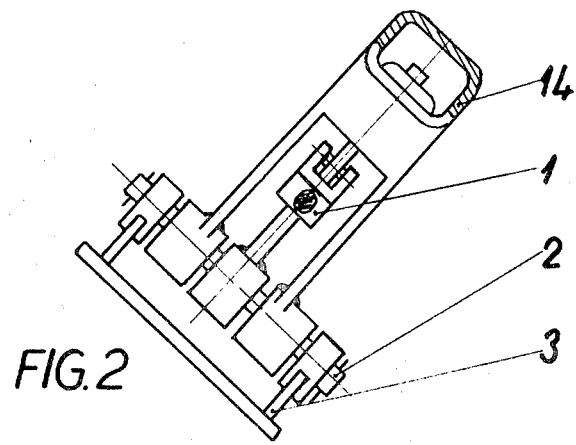
FIG. 2 is a fragmentary perspective view of an operating lever and related elements forming part of the system of FIG. 1.

The free end of arm 6 is articulated via a rod 5 to an arm 1 which is swingable about a fulcrum 2 on a fixed mounting 3. Swingable about the same fulcrum 2 (see also FIG. 2), but independently of arm 1, is an operating lever 14 provided with a hand grip 23 and with a pawl 24 coacting with a curved rack 25 to lock the lever 14 in a selected braking position; a handle 26, linked with pawl 24 via a rod 27, serves for the release of this backstop mechanism.

Figure 3:
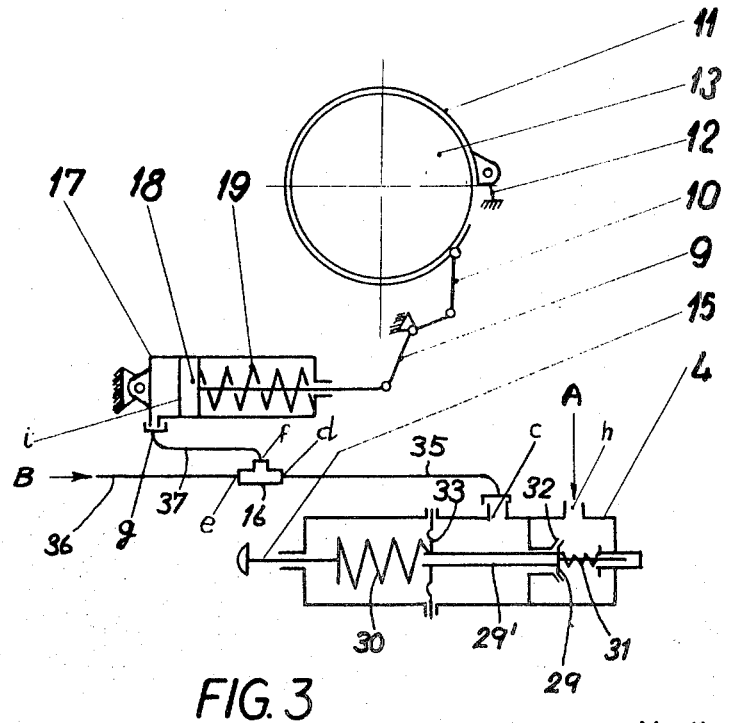
FIG. 3 is a diagrammatic showing of the fluid circuit associated with the system of FIGS. 1 and 2.

A lug 28 on lever 14 constitutes an abutment which bears upon a pin 15 projecting from a cylinder 4 of a throttle valve, this cylinder being rigid with mounting arm 1. As illustrated in FIG. 3, pin 15 acts as a control element for a valve body 29 inside cylinder 4, being connected with that valve body via a compression spring 30. Valve body 29 is normally held by a biasing spring 31 against a seat 32 and has a rod 29' terminating at a diaphragm 33 under pressure from spring 30.

The resiliency of brake band 11 tends to swing the arms 6 and 9 clockwise about their pivot 7, thereby tensioning the rod 5 and tending to maintain the tip $a$ of pin 15 in contact with abutment 28. A high-pressure fluid line 34, extending from a source of hydraulic or pneumatic fluid symbolized by an arrow A, terminates at an inlet port $h$ of cylinder 4 which is separated by the valve 29, 32 from an outlet port $c$ of that cylinder. The last-mentioned port is connected via a conduit 35 to an inlet port $d$ of a shuttle valve 16 having a second inlet port $e$ connected to another fluid line 36; a source of overriding fluid pressure, symbolized by an arrow B, may be connected to line 36 under emergency conditions to actuate the brake 11, 13. Shuttle valve 16 has an outlet port $f$ connected through a conduit 37 to an inlet port $g$ of valve cylinder 17.

With operating lever 14 swung counterclockwise (as viewed in FIG. 1) into a fully retracted position, throttle valve 29, 32 is completely closed so that no high-pressure fluid can pass through its cylinder 4 from port $h$ to port $c$. With no fluid pressure applied to port $d$ of shuttle valve 16, servo cylinder 17 is vented so that spring 19 represses its piston 18 whereby the brake band 11 is released.

When the operator desires to tension the brake band 11, he swings the lever 23 clockwise until the abutment 28 displaces the control pin 15 sufficiently to crack open the valve 29, 32 to a desired extend; the pressure acting upon the pin 15 is distributed over the springs 30 and 31, in accordance with their relative stiffness, so that the displacement of valve body 29 is only a fraction of that of pin 15. Fluid now streams through lines 35 and 37 into port $g$ of cylinder 17 to act upon the rear face $i$ of piston 18, thereby moving the latter toward the right with resulting tightening of brake band 11. This motion, transmitted to brake shoe 21 via levers 9 and 10, is also communicated to rod 5 whereby the mounting arm 1 is swung clockwise about its fulcrum 2 to reduce the relative displacement of the valve body 29 and its seat 32. At the same time, the land $b$ of cylinder 4 traversed by pin 15 recedes from the confronting abutment 28 of lever 14 so as to maintain a clearance therebetween even if the lever is swung through a larger arc than that originally separating the land $b$ from that abutment. The operator, working against the increasing reaction force of compression spring 30, experiences a resistance substantially proportional to the applied braking force in moving the lever 14 toward a limiting position in which the throttle valve is fully open.

If a major leak or other defect in conduit 34, 35 or 37 should prevent proper operation of the pneumatic or hydraulic servomotor 17-19, mounting arm 1 would substantially remain in its original position even as pin 15 is pushed inwardly against the combined force of springs 30 and 31. After a relatively short clockwise swing of operating lever 14, the lug 28 of this lever then engages the yieldable stop constituted by land $b$ of cylinder 4 so that a further advance of the lever entrains this cylinder along with arm 1 and linkage 5, 6, 9, 10 to tension the brake band 11 by mechanical force transmission. The operator, sensing the increased force required to displace the lever 14, is immediately apprised of the failure in the fluid circuit so that corrective measures can be taken.

I claim:

1. A brake system comprising:

brake-actuating means;

fluid responsive servo means connected with said brake-actuating means;

a source of operating fluid for said servo means;

a fluid circuit between said source and said servo means including valve means provided with a control element for applying a variable fluid pressure to said servo means; with a fixed fulcrum;

a manually displaceable operating lever pivoted on said fulcrum and provided with an abutment confronting said control element, said valve means being provided with spring means urging said control element toward said abutment and into a position of closure cutting off the supply of fluid to said servo means, a swing of said lever about said fulcrum in a predetermined direction displacing said control element against the force of said spring means into an open position admitting fluid to said servo means for operating said brake-actuating means;

a mechanical linkage between said brake-actuating means and said mounting for swinging the latter about said fulcrum in said predetermined direction upon the admission of fluid to said servo means, thereby causing said control element to recede from said abutment; and stop means on said mounting engageable by said lever for entrainment in said predetermined direction upon failure of said fluid circuit, said brake-actuating means being mechanically operable via said linkage in response to such entrainment.

2. A system as defined in claim 1 wherein said valve means comprises a movable cylinder integral with said stop means and a valve body in said cylinder, said control element being operatively coupled with said valve body and projecting from said cylinder.

3. A system as defined in claim 2 wherein the coupling between said valve body and said control element includes an interposed resilient link forming part of said spring means.

4. A system as defined in claim 2 wherein said cylinder has a land penetrated by said control element, said lever being provided with an abutment normally engaging said control element, said land constituting said stop means and being engageable by said abutment upon repression of said control element into said cylinder.

5. A system as defined in claim 1 wherein said brake-actuating means comprises a brake band having a fixed and a mobile end, said servo means including a valve piston and an articulated connection between said valve piston and said mobile end.

6. A system as defined in claim 5 wherein said connection includes a lever arm having a fixed pivotal axis, said linkage comprising a rod hingedly connected with said lever arm and with said mounting.

7. A system as defined in claim 1 wherein said fluid circuit includes a supply of overriding fluid pressure applicable to said servo means under emergency conditions.

* * * * *